H. M. FORD.
FARM TRACTOR.
APPLICATION FILED NOV. 21, 1916.

1,249,059.

Patented Dec. 4, 1917.
3 SHEETS—SHEET 1.

Witness
Andrew J.
P. M. Smith

Inventor
H. M. Ford,
By Victor J. Evans
Attorney

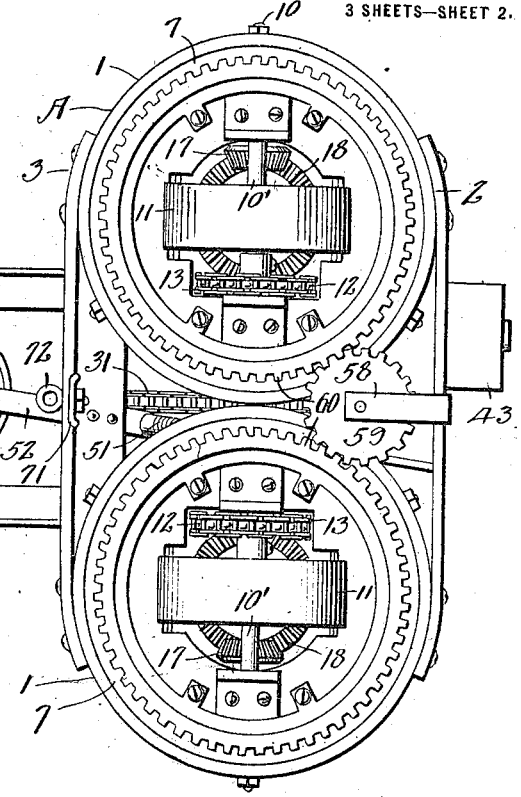

H. M. FORD.
FARM TRACTOR.
APPLICATION FILED NOV. 21, 1916.

1,249,059

Patented Dec. 4, 1917.
3 SHEETS—SHEET 3.

Witness
Inventor
H. M. Ford,
By Victor J. Evans
Attorney

UNITED STATES PATENT OFFICE.

HERMAN M. FORD, OF BONE GAP, ILLINOIS.

FARM-TRACTOR.

1,249,059. Specification of Letters Patent. Patented Dec. 4, 1917.

Application filed November 21, 1916. Serial No. 132,665.

*To all whom it may concern:*

Be it known that I, HERMAN M. FORD, a citizen of the United States, residing at Bone Gap, in the county of Edwards and State of Illinois, have invented new and useful Improvements in Farm-Tractors, of which the following is a specification.

This invention relates to farm tractors, the object being to produce novel driving mechanism between the motor and traction wheels of the machine whereby two traction wheels capable of being turned for steering purposes may be positively driven irrespective of the angles assumed by said traction wheels, the traction wheels thus constituting the steering wheels.

A further object in view is to so arrange the driving and steering connections that while the machine is being propelled by the driving mechanism, the traction wheels may be turned, if desired, completely at right angles to their straight ahead position for the purpose of enabling the tractor to be turned in a minimum amount of space. Furthermore the tractor is adapted to be propelled either in a forward or rearward direction and the main body portion of the frame of the tractor under which the traction wheels are located, may be propelled laterally with respect to the normal direction of travel of the machine.

With the above and other objects in view, the invention consists in the construction, combination and arrangement, herein fully described, illustrated and claimed.

In the accompanying drawings:

Fig. 2 is a bottom plan view of the same.

Fig. 4 is a vertical transverse section taken in line with the driving shaft and showing part of the differential gearing directly associated with said driving shaft.

Figure 1:
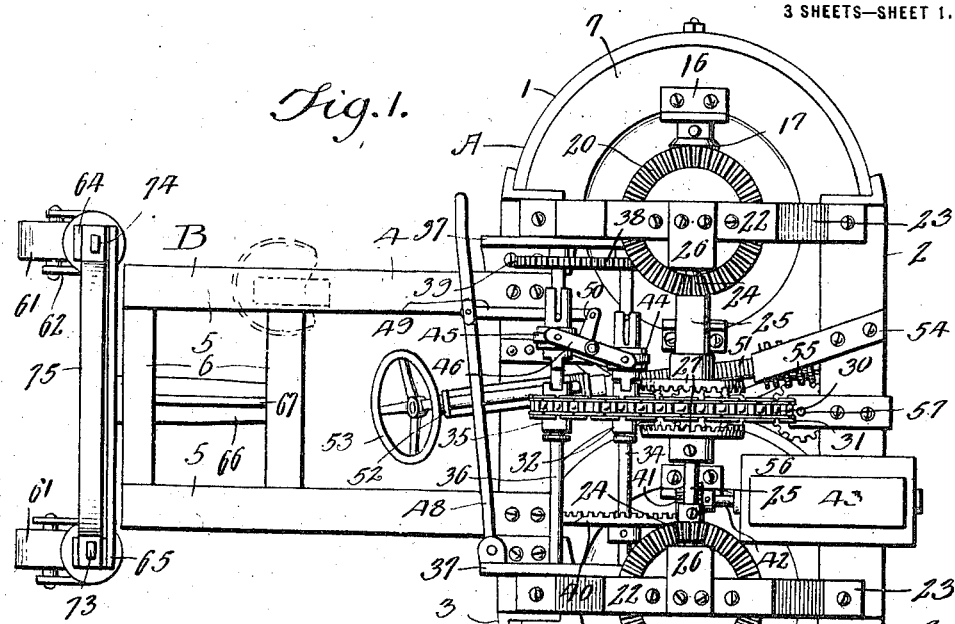
Figure 1 is a top plan view of the improved farm tractor, omitting the driver's platform in order to better illustrate the mechanism involved.
Figure 6:
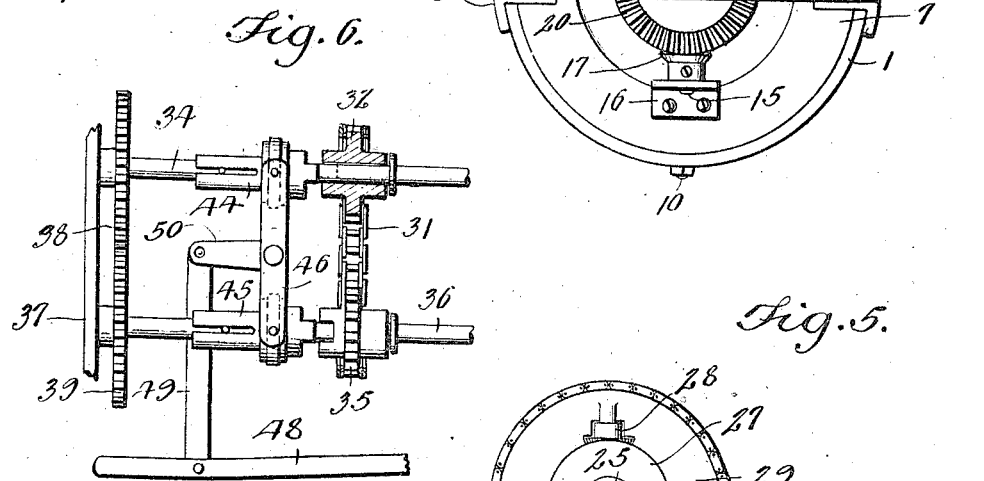
Fig. 6 is a fragmentary plan view taken just above the clutches, the transmission shaft, the transmission countershaft, and the gears and shifting lever.
Figure 5:
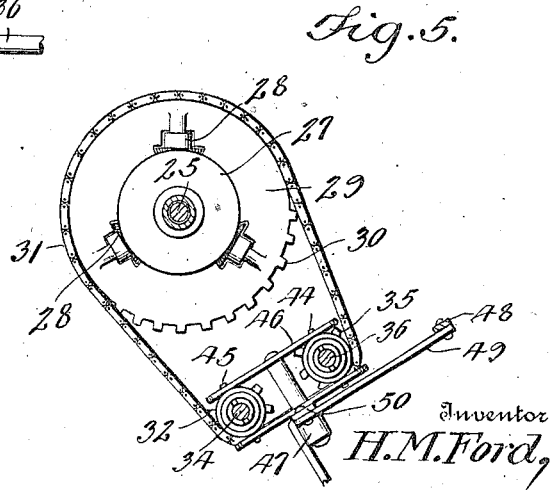
Fig. 5 is a fragmentary vertical longitudinal section taken adjacent to the ring gear and through the transmission shaft and countershaft.
Figure 3:
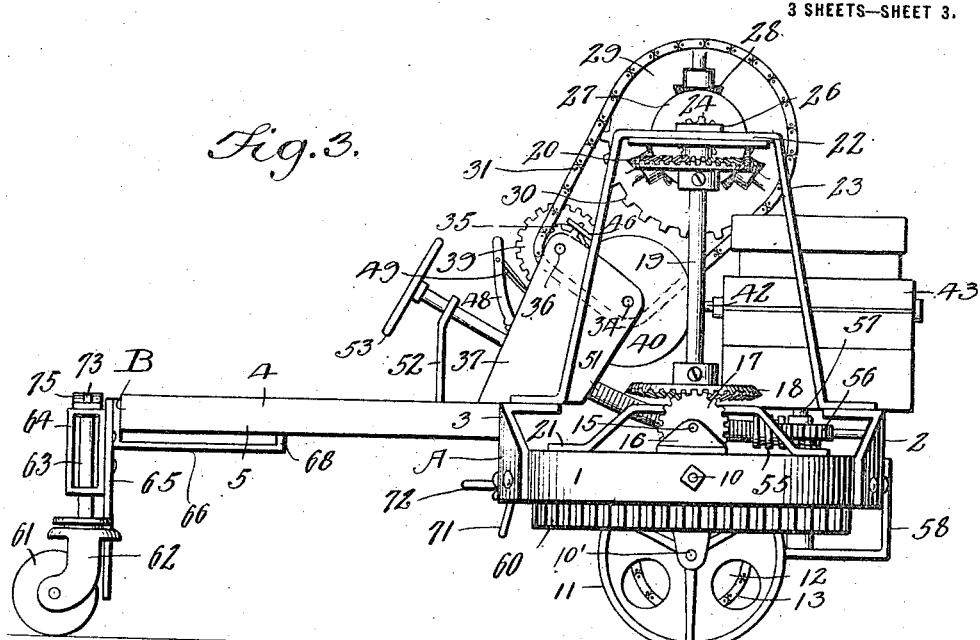
Fig. 3 is a side elevation thereof.
Figure 1:
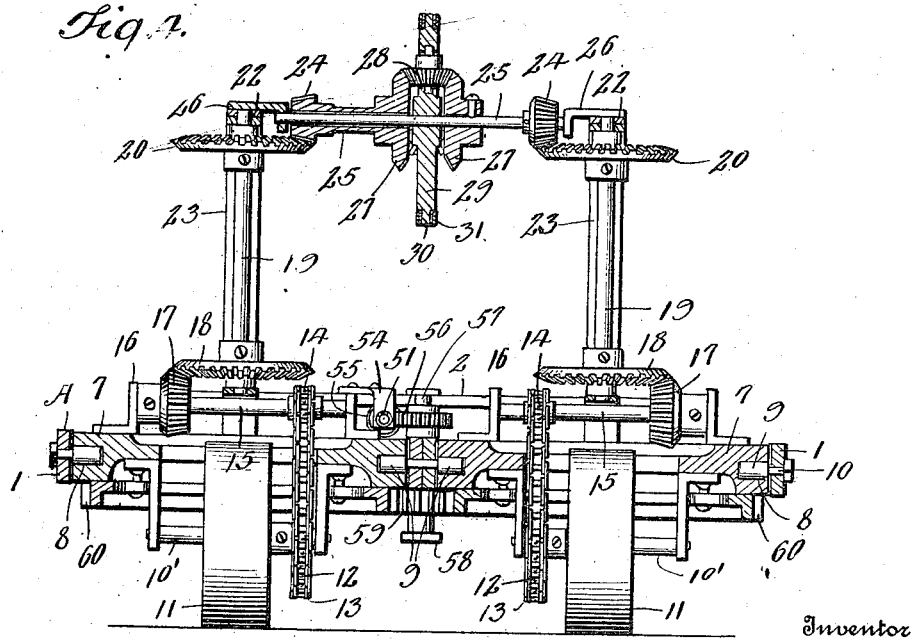

Fig. 7 is a fragmentary vertical longitudinal section showing the relation thereto of the draft pole or tongue of a farming implement being towed by the tractor.

Fig. 8 is a detailed perspective view of the rear wheel bolster or hanger.

The truck frame of the farm tractor comprises a front portion designated generally at A and a rear portion designated generally at B. The front portion of the truck frame embodies a pair of transversely opposite annular truck bolsters 1 bearing a fixed relation to the frame as a whole, the said truck bolsters being shown as formed separately from each other and tied together by means of the transversely extending front and rear transverse bars 2 and 3. The bolsters 1 and transverse tie bars 2 and 3 form the main part of the forward section of the truck frame. The rear section of the truck frame comprises longitudinal tie bars 4 arranged in spaced parallel relation to each other and connected by cross bars 6, the side bars 5 being fastened at their forward ends to the front section of the frame and directly to the rear cross bar 3. The rear section of the frame is designed to support a suitable platform, (not shown) and the rear end of said rear section of the truck frame is carried by wheels hereinafter more particularly referred to.

In connection with each of the fixed truck bolsters 1, I employ a rotatable wheel carrying bolster 7 which is mounted to turn relatively to the fixed bolster, being formed with an annular groove 8 in the periphery thereof in which are arranged anti-friction rollers 9 mounted on stud shafts 10 extending inwardly from the fixed bolster. This enables the wheel carrying bolster to rotate and be actuated by the means hereinafter described for the purpose of steering the machine. Each wheel carrying bolster has extending downwardly therefrom a pair of hangers in which is journaled the shaft 10 of the adjacent traction wheel 11. Fast on the shaft 10 and bearing a fixed relation to the traction wheel 11 is a sprocket wheel 12 from which a drive chain 13 extends upwardly through the open center of the rotatable bolster where it passes around another sprocket wheel 14 fast on a horizontal shaft 15 extending over the top of the traction wheel and journaled in bearings 16 secured in fixed relation to the rotatable bolster at diametrically opposite points. The said horizontal shaft extends diametrically of the rotatable bolster.

Fast on the horizontal shaft just referred to is a bevel gear 17 which meshes with and is driven by another bevel gear 18 on the lower end portion of a vertical driving shaft 19 which has fast thereon another bevel gear 20 adjacent to its upper end. Said vertical driving shaft is journaled at its lower end in a strut bar 21 secured to the rotatable bolster and extending diametrically across the open center thereof. The upper end of said vertical driving shaft is journaled in the upper horizontal portion 22 of an arched support 23.

The construction just above referred to is duplicated at both sides of the machine and the upper bevel gears on the vertical driving shafts are in mesh with and are actuated by bevel pinions 24 on the opposite extremities of a driving shaft 25, the opposite extremities of said shaft being journaled in bearing members 26 secured to the arched supports hereinabove referred to.

The driving shaft 25 is of the divided or sectional type and the inner ends of the two sections are connected together by differential gearing somewhat similar to that used in automobile practice in connection with the rear driving axle. In other words the sections of the driving shaft 25 have fast on their inner ends oppositely disposed and facing bevel gears 27 between which are arranged bevel pinions 28 journaled in the body or web of a ring gear 29. The ring gear 29 is provided with sprocket teeth 30 to receive a sprocket chain 31 which engages a sprocket wheel 32 on a transmission shaft 34, said chain also passing around another sprocket wheel 35 on a transmission countershaft 36, both of the last named shafts being parallel to each other and journaled in arms or brackets 37 in fixed relation to the front section of the frame. The transmission shaft and countershaft are geared together for simultaneous rotation in opposite directions by means of gears 38 and 39 fast thereon. The transmission shaft also has fast thereon a bevel gear 40 which meshes with and is actuated by a pinion 41 on the shaft 42 of the motor 43. The motor may be of any desired type, being shown in the form of an internal combustion engine and the same being mounted directly upon and secured to the front section A of the truck frame.

The sprocket wheels on the transmission shaft and its countershaft are normally loose but are adapted to be thrown into and out of locked engagement therewith by means of clutches 44 and 45, each of said clutches being feathered to its respective shaft as shown and being slidable toward and away from a clutch face on the sprocket wheel. The two clutches are connected by a yoke lever 46 which is pivotally mounted between its ends on a fulcrum post 47 extending upwardly from the truck frame, the arrangement being such that when one of the clutches is shifted in one direction the other clutch is shifted in the other direction, thus only one of the sprocket wheels on the transmission shaft and its countershaft may be thrown into engagement at the same time. 48 designates a hand controlled clutch shifting lever which is connected by a link 49 to an arm 50 of the oscillatory clutch yoke, said lever being in convenient reach of the operator. By the mechanism just described, the driving mechanism may be reversed for the purpose of driving the machine either in a forward or rearward direction.

The steering mechanism of the tractor comprises, in the preferred embodiment of this invention, a flexible steering shaft 51 the rear end portion of which is journaled in a bracket 52 secured to and extending upwardly from the truck frame, a hand wheel 53 being fast on the rear end of said steering shaft. The forward end of said steering shaft is journaled in a supporting member 54 secured to the truck frame and is provided with a worm 55 which meshes with the worm gear 56 on the upper end portion of a short vertical shaft 57 having one end journaled in the frame and the other end journaled in and supported by a bearing step or hanger 58 also secured to the truck frame. Fast on the lower end portion of the last named shaft is a spur gear 59 which meshes with a pair of relatively larger spur gears 60 which are secured in fixed relation to the two rotatable bolsters which carry the traction wheels hereinabove referred to. Therefore when the hand steering wheel is turned in a certain direction, through the medium of the connections just described, both of the traction wheels are caused to turn in a corresponding direction. Furthermore the traction wheels may be turned through an arc of 90° which enables the farm tractor to be turned in a minimum amount of space. Due to the construction of the driving gearing, the latter will not be interfered with no matter what angles are assumed by the traction wheels for the reason that the rotatable bolsters for the traction wheels turn on the axes of the respective vertical driving shafts which are geared to the over-head driving shaft hereinabove particularly described.

For supporting the rear end of the truck frame, I employ oppositely located carrying wheels 61 the same being preferably mounted in rearwardly extending forks 62 having substantially vertical spindles 63. These spindles are journaled in bearings 64 bearing a fixed relation to the opposite ends of a rear bolster or hanger 65. Extending forwardly from said rear bolster is an arm 66. A hinge pin 67 extends through the bolster and the upturned end portion 68 of said arm and also through the cross bars of the rear frame section B. The rear bolster or hanger is thus pivotally connected with the truck frame and adapted to swing on a horizontal fore and aft axis so that the rear wheels may accommodate themselves to the road. The rear bolster or hanger is also formed with a vertically extending slot 69, the same being open at the bottom so as to receive the draft pole or tongue of a farming implement to be towed behind the tractor. Such draft pole or tongue indicated at 70 is extended far enough forward to enter a ring or loop 71 on the rear cross bar 3 of the front section on the truck frame. 72 designates an eye to receive fastening means whereby said draft pole or tongue may be fastened to the tractor. The draft pole or tongue may play upwardly and downwardly within said slot in the rear bolster or hanger.

In order to hold the rear wheels from swinging laterally when a farming implement is not hitched behind the tractor, the upper extremities of the spindles of the wheel carrying forks are squared or flattened as indicated at 73 and are received in correspondingly shaped openings 74 in a lock bar 75. This lock bar is readily detachable so that the rear wheels may be left free to swivel and trail behind the front portion from place to place when a farming implement having a pole or tongue is being towed.

From the foregoing description taken in connection with the accompanying drawings, it will now be understood that the steering mechanism and the driving mechanism are of such characters and are so combined that the steering mechanism and the driving mechanism do not interfere with each other in the slightest manner used conjointly. There can be no binding or cramping action on the driving mechanism and the steering mechanism. Furthermore by reason of the construction described, the traction wheels may be turned to either side or through an arc of 180°. This enables the tractor to be turned in a circumscribed space, a particularly valuable feature where the garage or storage place for the tractor is small.

It also facilitates backing the tractor up to a farming implement so as to connect the two machines together.

I claim:

1. In a farm tractor, the combination of a truck frame embodying transversely opposed and fixed bolsters, a pair of rotatable traction wheel-carrying bolsters mounted within the fixed bolsters, means for simultaneously turning both wheel bolsters in the same direction, and driving mechanism for said traction wheels comprising a motor, a transmission shaft driven by said motor, a transmission countershaft parallel to said transmission shaft, an over-head driving shaft, chain gearing connecting said driving shaft with the transmission shaft and countershaft, clutch mechanism for reversing the direction of movement of said chain gearing, differential gearing associated with said driving shaft, vertical shafts geared to said driving shaft and having their longitudinal axes in line with the axes of movement of the bolsters of the traction wheels, horizontally disposed shafts geared to said vertical shafts, and chain driving means between said last named horizontal shafts and the traction wheels.

2. In a farm tractor, the combination of a truck frame embodying transversely opposed and fixed bolsters, a pair of rotatable traction wheel-carrying bolsters mounted within the fixed bolsters, means for simultaneously turning both wheel bolsters in the same direction, and driving mechanism for said traction wheels comprising a motor, a transmission shaft driven by said motor, a transmission countershaft parallel to said transmission shaft, an over-head driving shaft, chain gearing connecting said driving shaft with the transmission shaft and countershaft, clutch mechanism for reversing the direction of movement of said chain gearing, differential gearing associated with said driving shaft, vertical shafts geared to said driving shaft and having their longitudinal axes in line with the axes of movement of the bolsters of the traction wheels, horizontally disposed shafts geared to said vertical shafts, and chain driving means between said last named horizontal shafts and the transmission wheels, said last named horizontal shafts being journaled in bearings carried by the rotatable bolsters.

3. In a farm tractor, the combination of a truck frame, a pair of oppositely located traction wheels, means for steering said traction wheels simultaneously in the same direction, a motor mounted on the truck frame, driving mechanism for said truck wheels embodying driving shafts vertically disposed with their longitudinal axes in line with the axes of the steering movement of the traction wheels, shafts disposed at right angles to said vertical shafts and journaled in bearings having a fixed relation to the axle bearings of the traction wheels, and chain drive mechanism between the last named shafts and said traction wheels.

4. In a farm tractor, the combination of a truck frame, oppositely located traction wheels arranged to swing laterally and simultaneously in the same direction, means for steering said wheels, and driving mechanism for said traction wheels, including a motor mounted on the truck frame, a transmission shaft driven by said motor, a transmission countershaft geared to said transmission shaft to turn in the opposite direction therefrom, sprocket wheels on said shafts, a driving shaft, a sprocket wheel thereon, a chain extending around all of said sprocket wheels, driving connections between said driving shaft and the traction wheels, and a reversing clutch coöperating with the sprocket wheels on the transmission shaft and its countershaft, whereby the driving shaft may be actuated in either direction for correspondingly reversing the direction of rotation of the traction wheels.

In testimony whereof I affix my signature.

HERMAN M. FORD.

Copies of this patent may be obtained for five cents each, by addressing the "Commissioner of Patents, Washington, D. C."